US006582846B2

(12) United States Patent
Reynolds, III et al.

(10) Patent No.: US 6,582,846 B2
(45) Date of Patent: Jun. 24, 2003

(54) METHOD FOR PREPARING FUEL CELL COMPONENT SUBSTRATE OF FLEXIBLE GRAPHITE MATERIAL HAVING IMPROVED CATALYTIC PROPERTIES

(75) Inventors: Robert Anderson Reynolds, III, Bay Village, OH (US); Robert Angelo Mercuri, Seven Hills, OH (US); Ronald Alfred Greinke, Medina, OH (US)

(73) Assignee: Graftech, Inc., Lakewood, OH (US)

( * ) Notice: Subject to any disclaimer, the term of this patent is extended or adjusted under 35 U.S.C. 154(b) by 182 days.

(21) Appl. No.: 09/871,574

(22) Filed: May 31, 2001

(65) Prior Publication Data

US 2002/0182477 A1 Dec. 5, 2002

(51) Int. Cl.$^7$ ................................................. H01M 8/02
(52) U.S. Cl. .............................. 429/34; 429/40; 429/44
(58) Field of Search .............................. 429/14, 34, 35, 429/38, 40, 44; 423/414; 252/502

(56) References Cited

U.S. PATENT DOCUMENTS

| | | | |
|---|---|---|---|
| 3,404,061 A | 10/1968 | Shane et al. | 161/125 |
| 3,844,837 A | 10/1974 | Bennion et al. | 136/6 LN |
| 4,414,142 A | 11/1983 | Vogel et al. | 252/506 |
| 4,895,713 A | 1/1990 | Greinke et al. | 423/448 |
| 5,224,030 A | 6/1993 | Banks et al. | 361/386 |
| 5,260,124 A | 11/1993 | Gaier | 428/257 |
| 5,316,080 A | 5/1994 | Banks et al. | 165/185 |
| 5,414,142 A | 5/1995 | Chapman et al. | 568/579 |
| 5,902,762 A | 5/1999 | Mercuri et al. | 501/99 |
| 6,010,798 A | 1/2000 | Hammerschmidt et al. | 429/30 |

OTHER PUBLICATIONS

WO 00/64808, Publication Date: Nov. 2, 2000, Intl Appln. No. PCT/US00/09402, Inventors: Mercuri et al.

"Effect of Inserted Molecules on the Electrical Conductivity of $CsC_{24}$", Akuzawa et al, Carbon 39 (2001), pp 300–303.

*Primary Examiner*—Stephen Kalafut
*Assistant Examiner*—Monique Wills
(74) *Attorney, Agent, or Firm*—Paul S. Chirgott

(57) ABSTRACT

A method enables preparation of a stock or starting material having improved catalytic properties. These materials will be useful in the formation of articles adapted for use in electrochemical fuel cells.

16 Claims, No Drawings

METHOD FOR PREPARING FUEL CELL COMPONENT SUBSTRATE OF FLEXIBLE GRAPHITE MATERIAL HAVING IMPROVED CATALYTIC PROPERTIES

TECHNICAL FIELD

The invention relates to a flexible graphite material which has catalytic properties suitable for the preparation of graphite articles useful as components in electrochemical devices such as fuel cells and double-layer capacitors.

BACKGROUND OF THE INVENTION

The production of efficient, low-cost electrochemical devices like fuel cells is dependent upon the availability of suitable construction materials.

Electrochemical devices like fuel cells are foreseen by some as necessary to the commercial realization of low-emission vehicles as well as a number of stationary power needs. Fuel cells cleanly and efficiently convert suitable fuels to electrical energy. Their unique advantages make them promising for many power applications. In all cases, a balance must be struck between weight and performance, and it would be desirable to adjust manufacturing procedures of current construction materials to assure that both concerns are effectively addressed to provide a net improvement in the operation and/or economy of these devices. Flexible graphite sheet material has proved itself to be a highly effective construction material for fuel cell components and other applications.

Among the fuel cells where components of improved flexible graphite foil could be of advantage are ion exchange membrane fuel cells. Material selection and processing often favors flexible graphite foil due to its overall favorable combination of physical and electrical properties. Proton exchange membrane (PEM) fuel cells are of particular interest. Cells of this type produce electricity through the chemical reaction of hydrogen with oxygen from the air. Within the fuel cell, electrodes denoted as anode and cathode, surround a polymer electrolyte to form what is generally referred to as a membrane electrode assembly (or MEA). In some cells, the electrode component will also function as a gas diffusion layer (GDL). A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell is advantageously formed of a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or other platinum group metal coated on isotropic carbon particles, such as lamp black, bonded to either side of a proton exchange membrane disposed between the electrodes. It would be desirable to improve the catalytic activity of the electrode surfaces.

In operation of a PEM cell, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which join with the protons migrating through the proton exchange membrane and the electrons through the circuit. The result is the generation of current and the formation of water. Since the membrane is an electrical insulator, the electrons cannot directly cross the membrane, but seek the least resistance and travel through an external circuit which utilizes the electricity before the electrons join the protons at the cathode. An air stream on the cathode side is one mechanism by which the water formed by combination of the hydrogen and oxygen can be removed. Combinations of such fuel cells are used in a fuel cell stack to provide the desired voltage.

There remains a need in the art for improved materials of construction for fuel cell components which can improve needed catalytic properties.

SUMMARY OF THE INVENTION

Accordingly, it is an object of the invention to provide a catalyzed expanded graphite material having an array of desirable properties, including electrochemical catalytic activity useful in making electrochemical fuel cell components.

It is another object of the invention to provide materials and methods for imparting catalytic properties to flexible graphite materials, making them useful starting materials for forming a variety of shaped articles useful as components in fuel cells.

These and other objects are accomplished by the present invention, which provides a material useful as a substrate for forming electrochemical fuel cell elements and methods for preparing materials of this type.

The material of the invention is useful as a substrate for preparing articles such as an embossed or unembossed flexible graphite sheet, the material comprising: a compressed sheet of graphite comprised of intercalated graphite particles having an electrochemical fuel cell catalyst included therein.

According to the process of the invention, flexible graphite sheet is intercalated to an extent necessary to include an electrochemical fuel cell catalyst within graphite particles and then shaping the resulting sheet into any of a variety of shapes by any of a variety of processes.

Many preferred and alternative aspects of the invention are described below.

DETAILED DESCRIPTION OF THE INVENTION

The invention will be illustrated and explained in this description by specific reference to the production of a stock material of flexible graphite sheet having catalytic activity that is suitable for use in electrochemical devices such as fuel cells of the PEM type. It will be recognized, however, that while this description is made for illustrative purposes, the invention has broader applicability and is useful in the production of materials for many other end uses.

Central to all of the embodiments of the invention is the provision of a flexible graphite sheet material (also termed "foil") which is formed from exfoliated graphite and then further processed according to the invention to create new properties.

The material of the invention is useful as a substrate for preparing articles such as an embossed or unembossed flexible graphite sheet and comprises a compressed sheet of graphite comprised of intercalated graphite particles having graphite platinum group metal included therein. The material of the invention is made by intercalating with a material suitable for the purpose and to an extent necessary to insert the platinum group metal within the particles forming the sheet. The intercalated sheet can be formed into a variety of shapes by a variety of processes.

The starting material for the invention is any of the suitable flexible graphite sheet materials as are commercially available in a variety of grade and thicknesses and densities for a variety of end uses. Preferred starting materials can be binder free before and after processing or can be impregnated or coated with a suitable binder, preferably after intercalation of the sheet to improve electrical and/or thermal properties according to the invention. Suitable flexible graphite starting materials are available under the trademarks GRAFOIL® and GRAFCELL™ from Graftech, Inc. The sheet material, preferably after intercalation, can be impregnated with resin, such as an acrylic-, epoxy- or phenolic-based resin system, prior to shaping, such as by layering, with or without cutting, and then pressing with at least one shaping member, such as by embossing. Advantageously, the resin is cured during or after the step of shaping the flexible graphite sheet. The resin content of the resin-impregnated flexible graphite sheet material is preferably at least about 5%, and more preferably at least about 10%, by weight.

In the course of this description, we will refer to flexible graphite sheet or foil, and we mean to use these terms interchangeably. The term "flexible graphite sheet" in this context is meant to refer to an article made of compressed, exfoliated graphite either by itself or with one or more fillers or binders, wherein parallel surfaces of particles of graphite are oriented principally in a plane perpendicular to the "c" direction of the graphite particles and the thickness of the article in the direction parallel to the "c" direction is less than about 1.5 mm. The invention will have particular advantage when dealing with thin sheets, namely those of less than about 1.0 mm in thickness. Sheets having thicknesses in the range of from about 0.05 to about 0.5 mm will have particular advantage for some applications. For others, thicknesses of from 0.2 to 0.75 mm will be preferred. In yet others the range can be a narrow low range of from about 0.075 to about 0.2 mm. The flexible graphite sheet material is preferably of low area weight, e.g., from about 0.001 to about 1.4 g/cm$^2$, to facilitate impregnation and subsequent handling in roll form where that might be useful. In some cases, area weights of less than 0.5, e.g., from 0.1 to 0.4, will be useful. In others area weights of from above 0.5 to 1.4, e.g., from 0.6 to 1.0, will be useful. The flexible graphite sheet material can be of any desired density, e.g., from about 0.1 to about 1.8 g/cm$^3$. To facilitate processing in some cases, densities of less than 1.0, e.g., from 0.1 to 0.9 g/cm$^3$, will be useful. In others densities of greater than 1.2, e.g., from 1.2 to 1.4, g/cm$^3$ will be useful. Mid range densities of from about 1.0 to about 1.2 g/cm$^3$ are effective in many applications. Advantageously, thinner materials within the above ranges may be rolled into coils and transported as a continuous sheet rather than cut into pieces for shipment to facilitate processing and saves material.

Before describing the manner in which the invention improves current materials, a brief description of graphite and its formation into flexible sheets, which will become the primary substrate for forming the products of the invention, is in order.

Preparation of Flexible Graphite Foil

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be intercalated and exfoliated, is suitable for use with the present invention. Such graphite preferably has an ash content of less than 20% (weight), and for electrochemical uses less than 6% is often desired. More preferably, the graphite employed for the present invention will have a purity of at least about 94%. In the most preferred embodiment, the graphite employed will have a purity of at least about 99% for electrochemical fuel cell uses.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. The intercalation solution may also contain metal halides such as ferric chloride, and ferric chloride mixed with sulfuric acid, or a halide, such as bromine, as a solution of bromine and sulfuric acid or bromine, in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1,10-decanediol, decylaldehyde, 1-propanol, 1,3-propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.4 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

Preparation of Catalyst Intercalated Sheet Graphite Materials

The invention provides a material useful as a substrate for an embossed flexible graphite sheet by intercalation of flexible graphite foil prepared in the manner described above or other suitable process involving intercalation, exfoliation and sheeting. In its preferred forms, a flexible graphite foil of this type is obtained and then further intercalated with the objective of intercalating with chemical species and to a degree to impart electrochemical catalytic activity to the resulting material and any articles formed therefrom.

In a principal distinction from the commercial flexible graphite sheet materials as made from particles of intercalated graphite described above, the products of the invention are comprised of significant quantities of platinum group or other catalyst materials. The invention has the advantage that catalytically-active compounds can enhance the performance of electrochemical components where such activity is useful. Typical values of catalyst loading for fuel cell applications are typically stated as a function of surface area and are commonly within the range of from 0.01 to 0.3 mg/cm$^2$. More broadly, the range can be from 0.001 to 1.0 mg/cm$^2$.

To impart catalytic activity to flexible graphite based fuel cell components, flexible graphite sheet is intercalated using methods known in the art, such as those processes described above. In order to avoid repetition, that description will not be repeated in this section, and can be easily adapted to sheet with reference to the examples below. Among the compounds which can be used to effect platinum group metal intercalation are chloroplatinic acid, sodium chloroplatinate, potassium chloroplatinate, iron chloroplatinate, magnesium chloroplatinate, manganese chloroplatinate, and cerium chloroplatinate, as well as any of those compounds known to the art as useful for catalyzing fuel cell surfaces. Typically, the compound is used for intercalation and the intercalated sheet is then reduced, such as by heating in a hydrogen atmosphere.

Platinum group metal intercalation, e.g., $PtCl_2$ intercalation, can be performed by heating the graphite sheet in the presence of $PtCl_2$ in an atmosphere of chlorine gas to >500° C. for a minimum of 60 minutes. The platinum chloride intercalated graphite sheet is then reduced to platinum catalyst particles supported on the graphite sheet by heating to >400° C. in the presence of flowing hydrogen gas. In another procedure, a co-intercalation process can be used, in one case adding $H_2PtCl_6$ to the intercalating solution of an $H_2SO_4/HNO_3$ process of the type used for flakes. The resulting intercalated graphite would be expanded, reduced by hydrogen gas and then finally processed into graphite sheet. This sheet could be used as is or further intercalated according to the invention to improve its catalytic activity.

Also, while not related to flexible graphite sheet or platinum group metals, the disclosures of U.S. Pat. Nos. 4,414,142, 5,260,124, 5,316,080, 5,224,030, and 5,414,142, are incorporated herein by reference for their disclosure of intercalation procedures and materials. Also, incorporated by reference is the publication of Akuzawa, et al.; "Effect of inserted molecules on the electrical conductivity of $CsC_{24}$"; Carbon 39 (2001) 300–303. Depending on the specific application, it may be desirable to intercalate also to improve electrical and/or thermal properties in the manner taught therein.

Intercalation can be conducted with the intercalant in any suitable physical form and concentration at temperatures and pressures effective to achieve the desired results in terms of composition of graphite intercalation compounds and their concentration in the sheet material of the invention. Typically, the intercalant will be in liquid form and contains one or more platinum group metals. In some cases it is desirable to volatilize an intercalant. If desired, a potential can be impressed to facilitate intercalation. Particular platinum group metals include platinum, rhodium, palladium and iridium.

Following intercalation, the intercalated graphite sheet is compressed, such as by compression rollers or molding in a multipart compression mold. The compression step can impart a suitable surface configuration to the material and can emboss a suitable complex or other pattern into the sheet, such as described in International Publication No. WO 00/64808, the disclosure of which is incorporated herein by reference. Final product densities of from about 0.001 to about 2.5 grams/cm$^3$, typically less than 2.2, and more narrowly from 0.01 to about 1.5 grams/cm$^3$, can be effective for producing a variety of final products. In other cases, densities of from about 0.05 to about 0.5 grams/cm$^3$ will be desired. In others the range will be from about 0.5 to 1.0 grams/cm$^3$. The thickness of the sheets can vary over a wide range, e.g., from 0.075 to 1.4 mm, typically being under 1 mm and greater than 0.01 mm.

Laminates of the sheet material with any of a variety of other substrates can have utility. Among these other materials are GRAFOIL® and GRAFCELL™ flexible graphite foils having the same or different thickness or other property, such as composition. For example, a sheet can be intercalated according to the invention and then laminated to a similar untreated material or one with a mineral filler as taught above.

The intercalated sheet material can be impregnated, preferably following compression. One embodiment of an apparatus for continuously forming resin-impregnated and calendered flexible graphite sheet is shown in International Publication No. WO 00/64808 the disclosure of which is incorporated herein by reference. The resin-impregnation step can enhance the stability of the intercalated sheet preserving the properties. The impregnation process should be done with care and an awareness that it may render the catalyst particles inaccessible to the reactants.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A material useful as a substrate for preparing an article of an embossed or unembossed flexible graphite sheet, the material comprising:

a compressed sheet of graphite comprised of intercalated graphite particles having fuel cell catalyst included therein, said catalyst comprises a platinum group metal.

2. A material of claim 1 wherein the platinum group metal comprises one selected from the group of platinum, rhodium, palladium and iridium and combinations.

3. A material of claim 1 which comprises the platinum group metal at a concentration in the range of from 0.01 to 0.3 mg/cm$^2$.

4. A material of claim 3 which comprises the platinum group metal at a concentration in the range of from 0.001 to 1.0 mg/cm$^2$.

5. A material of claim 3 having a thickness of from 0.075 to 1.4 mm.

6. A material of claim 3 having a thickness of under 1 mm and greater than 0.01 mm.

7. A material of claim 1 which is embossed on one surface.

8. A material of claim 1 wherein the sheet contains resin at a level of at least about 5% in the flexible graphite sheet.

9. A process for preparing a material useful as a substrate for preparing an article of an embossed or unembossed flexible graphite sheet, comprising:

intercalating a sheet of flexible graphite to an extent necessary to form graphite intercalation compounds which increase the thermal and/or electrical conductivity of the graphite sheet, wherein an intercalant for said intercalating comprises a platinum group metal; and compressing the sheet following intercalation.

10. A process of claim 9 wherein the platinum group metal selected from the group of platinum, rhodium, palladium and iridium and combinations.

11. A process of claim 9 which comprises the platinum group metal at a concentration in the range of from 0.01 to 0.3 mg/cm$^2$.

12. A process of claim 11 which comprises the platinum group metal at a concentration in the range of from 0.001 to 1.0 mg/cm$^2$.

13. A process of claim 12 having a thickness of from 0.075 to 1.4 mm.

14. A process of claim 12 having a thickness of under 1 mm and greater than 0.01 mm.

15. A process of claim 1 including the step of embossing one surface of the sheet following intercalation.

16. A process of claim 9 including the step of impregnating with a resin at a level of at least about 5% in the flexible graphite sheet.

* * * * *